(12) United States Patent
Kawasaki

(10) Patent No.: US 10,698,968 B2
(45) Date of Patent: Jun. 30, 2020

(54) INFORMATION PROVIDING APPARATUS AND INFORMATION PROVIDING METHOD

(71) Applicant: ALPINE ELECTRONICS, INC., Tokyo (JP)

(72) Inventor: Yasuhiro Kawasaki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 260 days.

(21) Appl. No.: 15/955,325

(22) Filed: Apr. 17, 2018

(65) Prior Publication Data

US 2019/0012397 A1    Jan. 10, 2019

(30) Foreign Application Priority Data

Jul. 10, 2017    (JP) .................. 2017-134653

(51) Int. Cl.
| | |
|---|---|
| *G06F 16/00* | (2019.01) |
| *G06F 16/954* | (2019.01) |
| *G06F 17/30* | (2006.01) |
| *H04L 29/08* | (2006.01) |
| *G06F 16/9535* | (2019.01) |
| *G06Q 30/06* | (2012.01) |
| *G06F 16/9035* | (2019.01) |
| *H04W 4/02* | (2018.01) |

(52) U.S. Cl.
CPC ........ *G06F 16/954* (2019.01); *G06F 16/9035* (2019.01); *G06F 16/9535* (2019.01); *G06F 17/30867* (2013.01); *G06F 17/30873* (2013.01); *G06Q 30/0631* (2013.01); *H04L 67/22* (2013.01); *H04L 67/306* (2013.01); *H04L 67/325* (2013.01); *H04W 4/02* (2013.01)

(58) Field of Classification Search
CPC ............. G06F 16/9038; G06F 16/9535; H04L 67/325; H04L 67/22
See application file for complete search history.

(56) References Cited

U.S. PATENT DOCUMENTS

| | | | |
|---|---|---|---|
| 8,930,253 B1* | 1/2015 | Ball .................. | G06Q 40/00 705/35 |
| 2017/0193596 A1* | 7/2017 | Bol ................... | G06Q 40/025 |
| 2018/0349900 A1* | 12/2018 | Anderson ........... | G06Q 20/40 |

FOREIGN PATENT DOCUMENTS

JP    2009-204363    9/2009

* cited by examiner

*Primary Examiner* — Cheryl Lewis
(74) *Attorney, Agent, or Firm* — Brinks Gilso & Lione

(57) ABSTRACT

There is provided an information providing apparatus including: an accumulating section sequentially accumulating profile information of a user, which is generated by newly collecting user-relevant information including an action history of the user; an acquiring section acquiring a search result in a case where information search according to a request of the user is performed by using current profile information in the accumulated profile information; and a control section determining an output mode on the basis of the accumulated profile information to perform control such that the acquired search result is output in the determined output mode.

6 Claims, 14 Drawing Sheets

FIG. 9

| RELIABILITY | OUTPUT MODE INFORMATION | |
|---|---|---|
| | CONTENTS | AUDIO TONE |
| 0 TO 30% | "I'M NOT SURE WHETHER OR NOT IT IS APPROPRIATE FOR PREFERENCE OF MR. XX, BUT, FOR EXAMPLE, HOW ABOUT YYY?" | SLIGHTLY CONFIDENT |
| 30 TO 70% | "I THINK YYY IS APPROPRIATE FOR PREFERENCE OF MR. XX" | NORMAL |
| 70 TO 100% | "I RECOMMEND YYY WITH CONFIDENCE FOR MR. XX" | CONFIDENT |

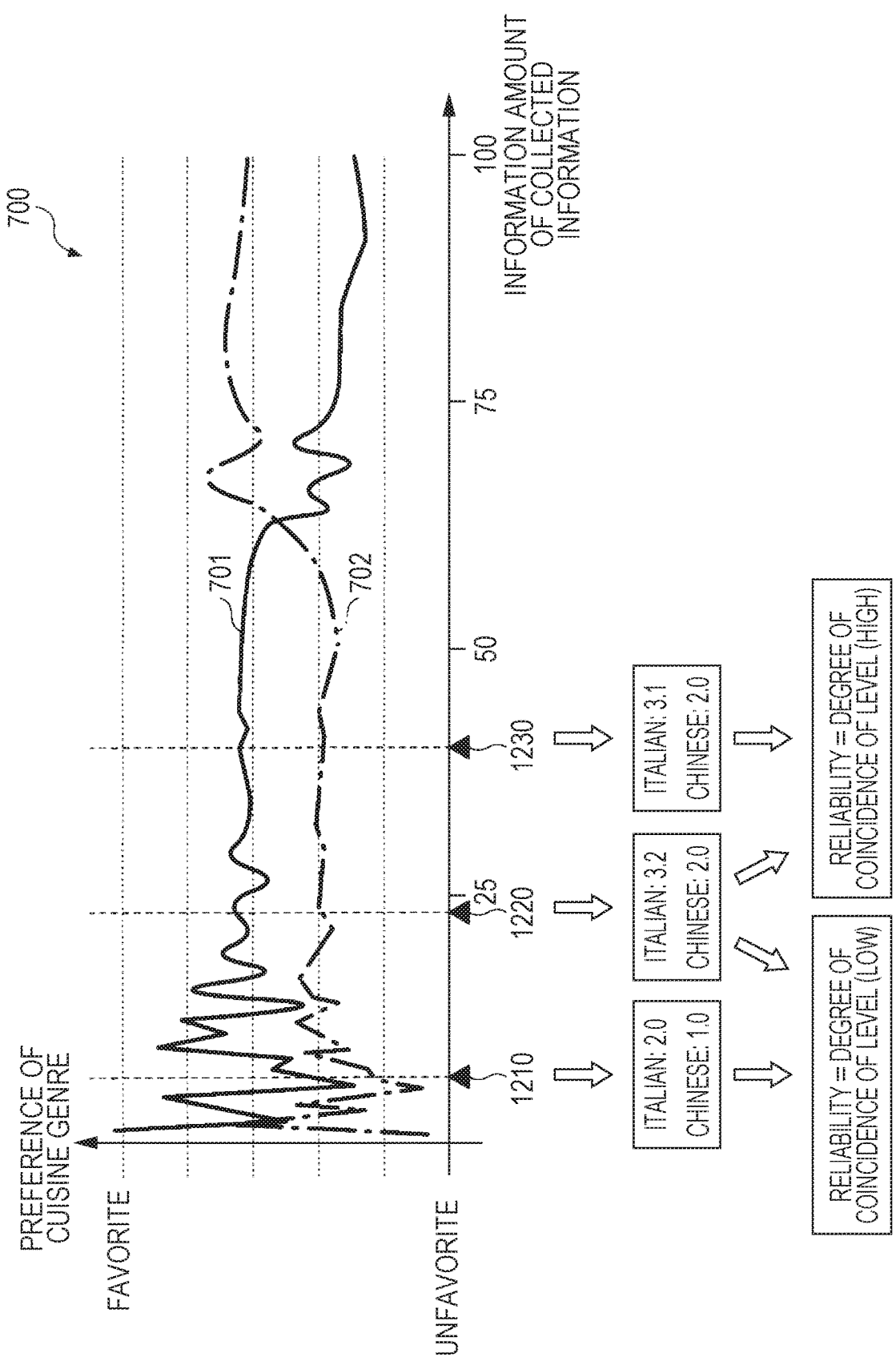

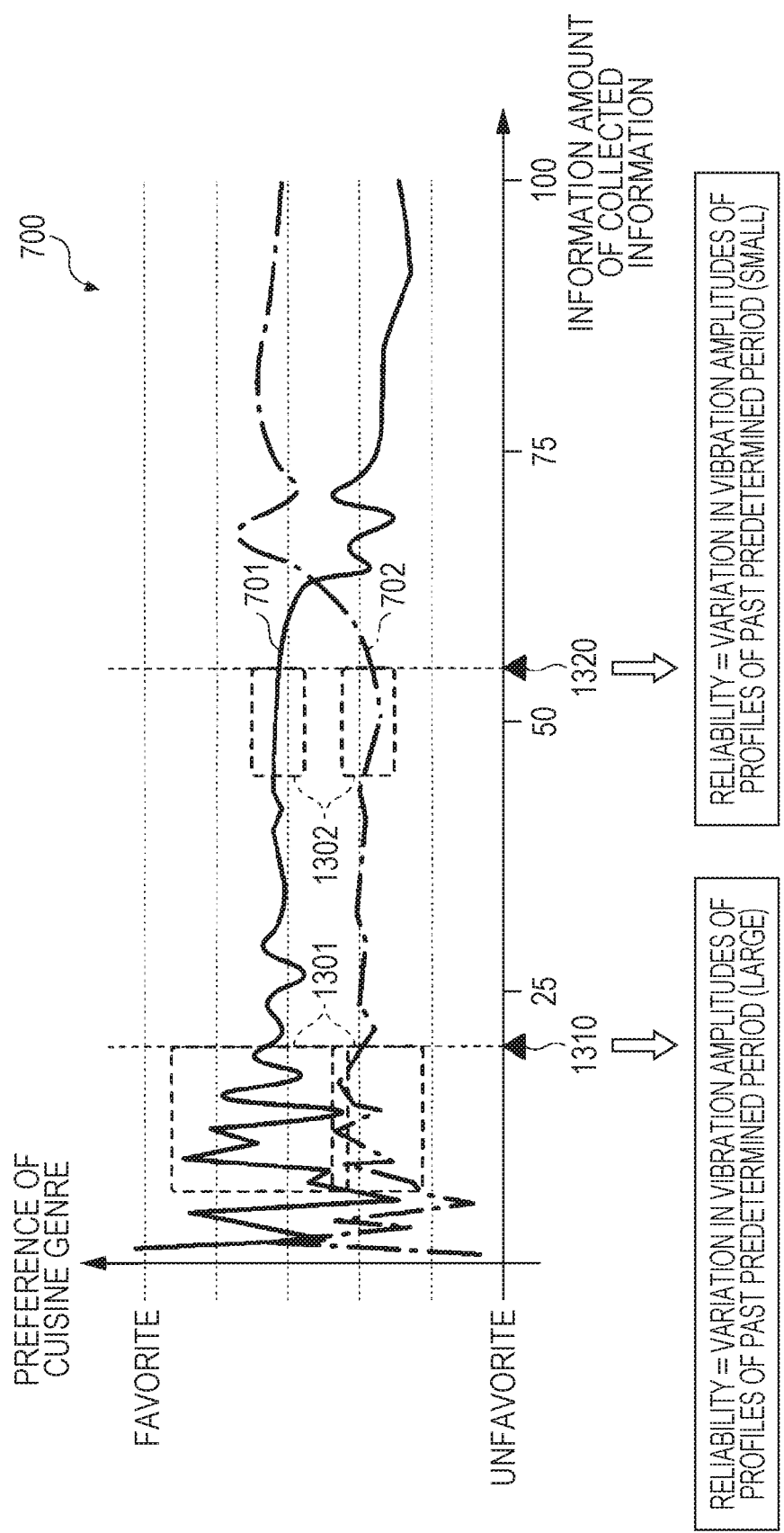

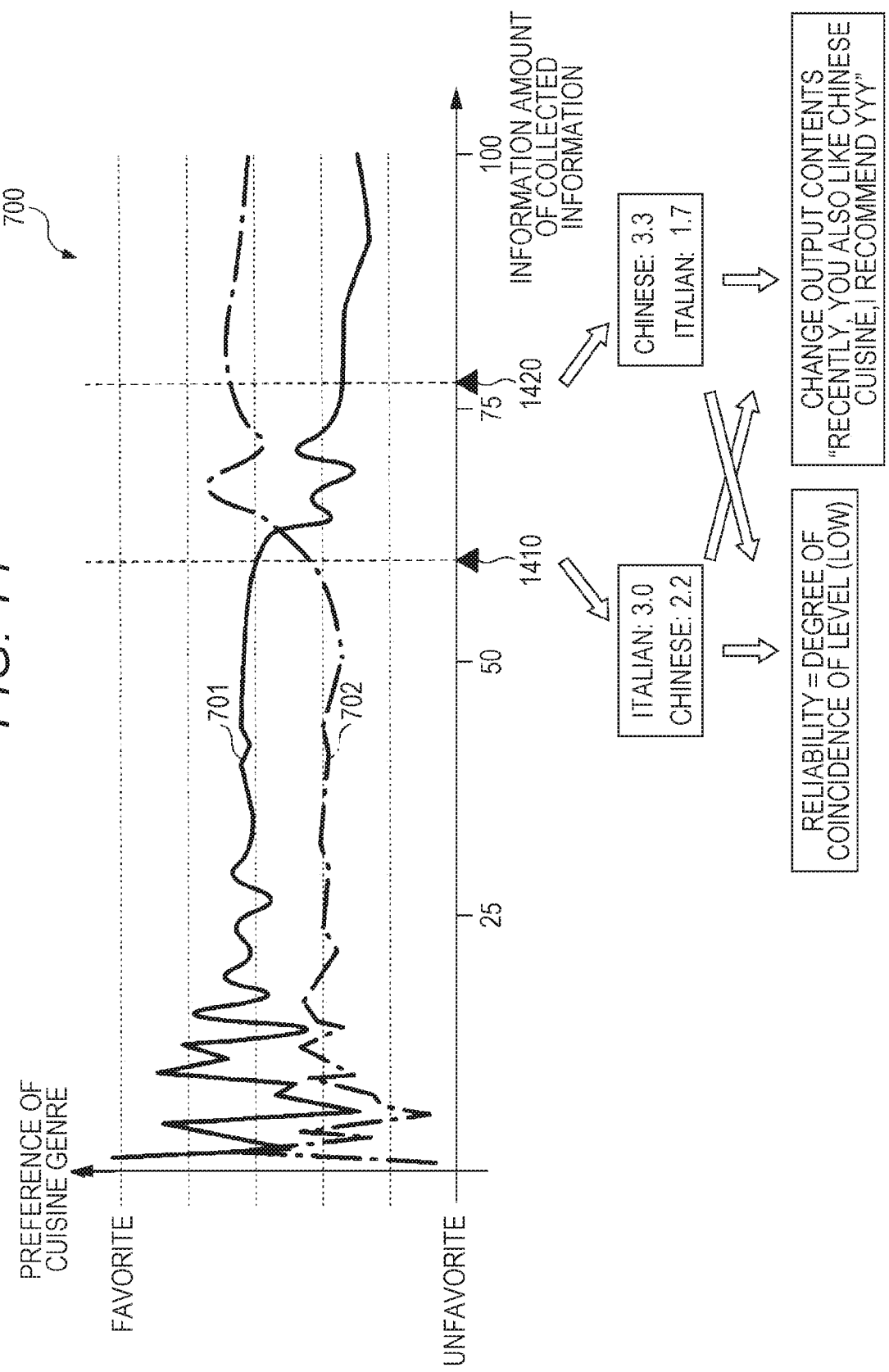

INFORMATION PROVIDING APPARATUS AND INFORMATION PROVIDING METHOD

RELATED APPLICATIONS

The present application claims priority to Japanese Patent Application Number 2017-134653, filed Jul. 10, 2017, the entirety of which is hereby incorporated by reference.

BACKGROUND

1. Field

The present disclosure relates to an information providing apparatus and an information providing method.

2. Description of the Related Art

From the related art, a recommend service has been known in which profile information of a user is generated by learning an action history or the like of the user, and information relevant to a recommended service, a commercial product, or the like for the user (recommend information) is provided on the basis of the generated profile information.

Various proposals have been made in order to provide the recommend service. For example, in JP 2009-204363 A, a user interface is proposed in which a user is capable of browsing which profile information is generated when the recommend service is provided. According to the user interface, the user is capable of confirming the profile information when the recommend information is displayed, and is capable of adding a change to the profile information, as necessary.

However, in the case of the user interface described above, the user is capable of confirming the contents of the profile information, but is not capable of grasping the reliability of the confirmed profile information. For this reason, it is not clear whether or not the displayed recommend information is the recommend information which is provided by using profile information having a high reliability, and therefore the user does not know to what extent the recommend information is referred.

The present disclosure has been made in consideration of the circumstances described above, and an object thereof is to enable a user to grasp a reliability of profile information when recommend information is provided.

According to one aspect, an information providing apparatus has the following configurations. That is, the information providing apparatus includes:
an accumulating section sequentially accumulating profile information of a user, which is generated by newly collecting user-relevant information including an action history of the user;
an acquiring section acquiring a search result in a case where information search according to a request of the user is performed by using current profile information in the accumulated profile information; and
a control section determining an output mode on the basis of the accumulated profile information to perform control such that the acquired search result is output in the determined output mode.

When recommend information is provided, a user is capable of grasping a reliability of profile information.

BRIEF DESCRIPTION OF THE DRAWINGS

FIG. 9 is a diagram illustrating a specific example of output mode information;

FIG. 12 is a first diagram illustrating a specific example of the profile information and a calculating method of reliability information;

FIG. 13 is a second diagram illustrating a specific example of the profile information and the calculating method of the reliability information; and, FIG. 14 is a diagram illustrating a specific example of the profile information and a change example of output contents.

DETAILED DESCRIPTION

Figure 1:
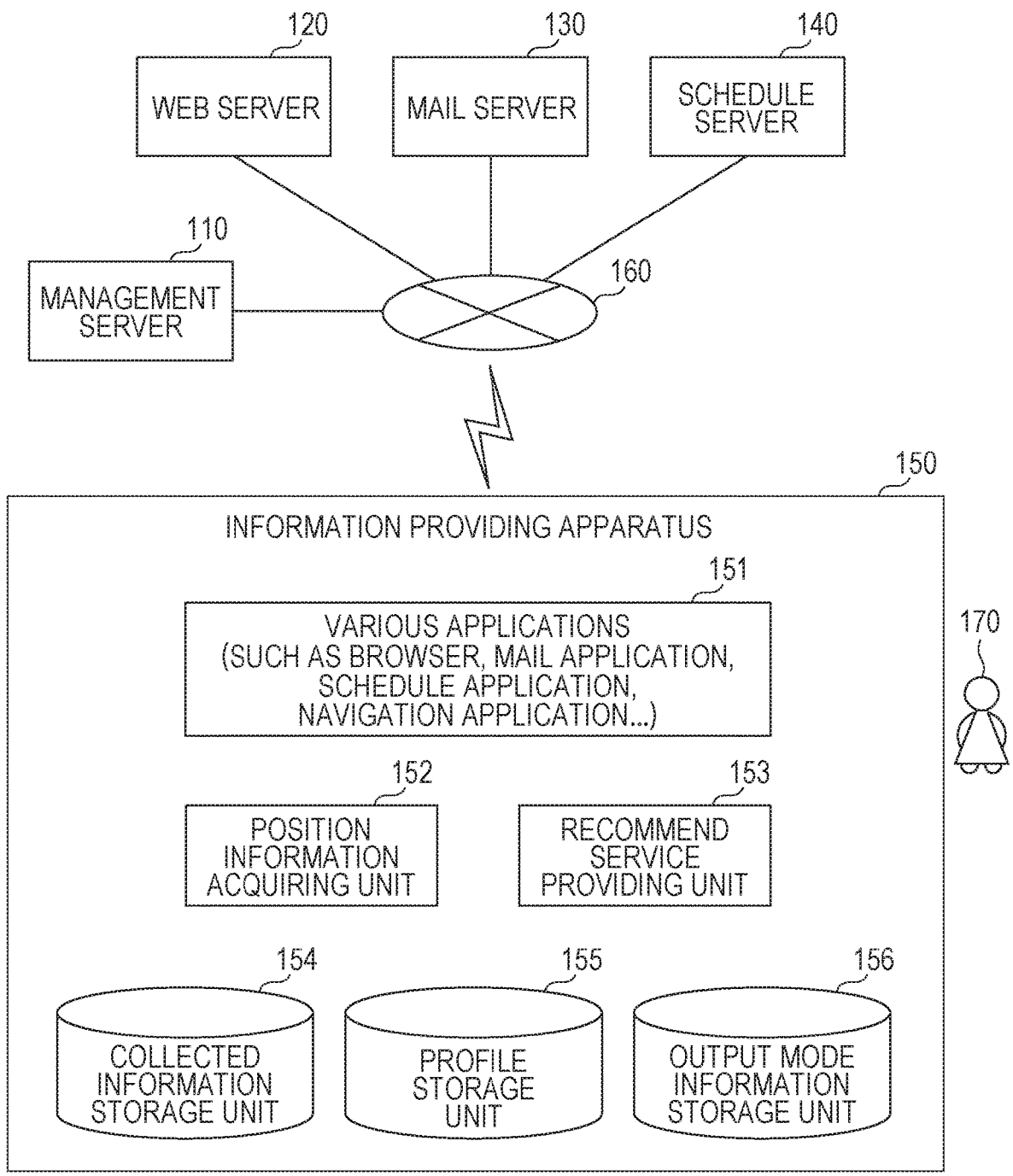
FIG. 1 is a diagram illustrating an example of a system configuration of a recommend service providing system.

Hereinafter, each embodiment will be described with reference to the attached drawings. Furthermore, herein and in the drawings, the same reference numerals are applied to constituents having substantially the same functional configuration, such that duplicative description will be omitted.

I. First Embodiment

System Configuration of Recommend Service Providing System

First, a system configuration of a recommend service providing system will be described. FIG. 1 is a diagram illustrating an example of the system configuration of the recommend service providing system. As illustrated in FIG. 1, a recommend service providing system 100 includes a management server 110, a Web server 120, a mail server 130, a schedule server 140, and an information providing apparatus 150. Furthermore, the management server 110, the Web server 120, the mail server 130, the schedule server 140, and the information providing apparatus 150 are connected to communicate with each other through a network 160. In addition, a user 170 performs various operations with respect to the information providing apparatus 150.

The user 170 operates the information providing apparatus 150, and thus, the management server 110 receives information which is collected by the information providing apparatus 150 (hereinafter, referred to as collected information) from the information providing apparatus 150, and performs learning processing, and thus, generates profile information indicating the profile of the user 170. In addition, the management server 110 transmits the generated profile information to the information providing apparatus 150.

The Web server 120, the mail server 130, and the schedule server 140 are operated according to a request from various applications 151 installed in the information providing apparatus 150. In a case where the request from the various applications 151 is received, the Web server 120, the mail server 130, and the schedule server 140, for example, transmit and receive Web contents subjected to information search, requested mail information, schedule information, and the like, with respect to the information providing apparatus 150.

The information providing apparatus 150, for example, is realized by a communication terminal such as a navigation device, a smart terminal, or the like. In this embodiment, the various applications 151 are installed in the information providing apparatus 150. For example, a browser is included in the various applications 151, and the user 170 accesses the Web server 120 by using the browser, and downloads various Web contents (news contents, music contents, and the like).

In addition, for example, a mail application is included in the various applications 151. The user 170 transmits mail information to the mail server 130 by using the mail application, or receives the mail information from the mail server 130.

In addition, for example, a schedule application is included in the various applications 151. The user 170 registers the schedule information in the schedule server 140 by using the schedule application, or receives a notification according to the registered schedule information.

Further, for example, a navigation application is included in the various applications 151. The user 170 receives a route guide to a destination by using the navigation application, or displays a peripheral point of interest (PoI) on a map.

A position information acquiring program is further installed in the information providing apparatus 150, and when the program is executed, the information providing apparatus 150 functions as a position information acquiring unit 152. The position information acquiring unit 152 acquires position information (a latitude, a longitude, and an altitude) of the information providing apparatus 150 when the various applications 151 are executed, and notifies the position information to the various applications 151 or to a recommend service providing unit 153 while being executed.

A recommend service providing program is further installed in the information providing apparatus 150, and when the program is executed, the information providing apparatus 150 functions as a recommend service providing unit 153. The recommend service providing unit 153 stores the collected information, which is collected by executing the various applications 151, in a collected information storage unit 154. In addition, the recommend service providing unit 153 transmits the collected information, which is stored in the collected information storage unit 154, to the management server 110, and also receives the profile information of the user 170 by the management server 110, and stores the profile information in a profile storage unit 155. In addition, the recommend service providing unit 153 calculates a reliability of current profile information on the basis of the accumulated profile information. Furthermore, the reliability is a parameter indicating a progress of learning processing at the time of generating the profile information, and the reliability increases as the learning processing progresses.

In addition, when the user 170 accesses the Web server 120 by using the browser, the recommend service providing unit 153 refers to the profile information of the user 170 which is stored in the profile storage unit 155. Accordingly, the recommend service providing unit 153 is capable of performing recommend search (information search according to the profile information of the user 170) with respect to the Web server 120.

The recommend service providing unit 153 performs the recommend search, and thus, the browser acquires recommend information of the user 170 by the Web server 120, and outputs the acquired recommend information. Furthermore, the recommend service providing unit 153 refers to output mode information stored in an output mode information storage unit 156 when the browser outputs the recommend information. Accordingly, the recommend service providing unit 153 controls the browser such that the recommend information is output in an output mode according to the reliability of the current profile information.

Hardware Configuration of Information Providing Apparatus

Figure 2:
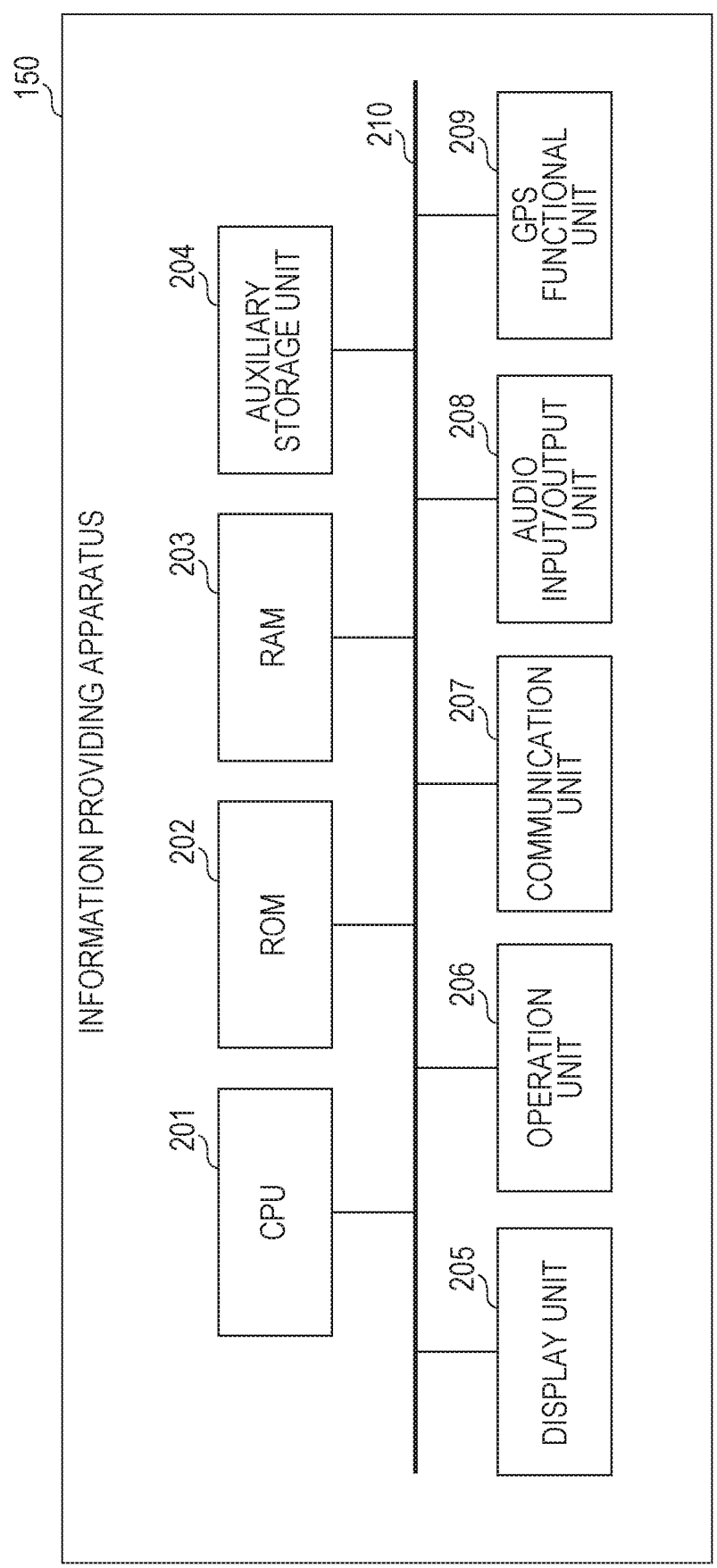
FIG. 2 is a diagram illustrating an example of a hardware configuration of an information providing apparatus.

Next, a hardware configuration of the information providing apparatus 150 will be described. FIG. 2 is a diagram illustrating an example of the hardware configuration of the information providing apparatus. As illustrated in FIG. 2, the information providing apparatus 150 includes a central processing unit (CPU) 201, a read only memory (ROM) 202, and a random access memory (RAM) 203. A so-called computer is formed of the CPU 201, the ROM 202, and the RAM 203. In addition, the information providing apparatus 150 includes an auxiliary storage unit 204, a display unit 205, an operation unit 206, a communication unit 207, an audio input/output unit 208, and a global positioning system (GPS) functional unit 209. Furthermore, the units of the information providing apparatus 150 are connected to each other through a bus 210.

The CPU 201 is a device executing various programs (for example, the various applications, the position information acquiring program, the recommend service providing program, and the like) which are installed in an auxiliary storage unit 204. The ROM 202 is a non-volatile memory, and functions as a main storage device storing various programs, data items, and the like, which are necessary for the CPU 201 to execute the various program installed in the auxiliary storage unit 204 CPU 201. Specifically, the ROM 202 stores a boot program such as a basic input/output system (BIOS) or an extensible firmware interface (EFI). The RAM 203 functions as a main storage device providing a working area which is expanded when the various programs installed in the auxiliary storage unit 204 are executed by the CPU 201.

The auxiliary storage unit 204 is an auxiliary storage device storing various programs, data used at the time of executing various programs, and the like. The collected information storage unit 154, the profile storage unit 155, and the output mode information storage unit 156 are realized in the auxiliary storage unit 204.

The display unit 205 is a display device displaying a processing result or the like (for example, the recommend information acquired by the recommend search, and the like) of the information providing apparatus 150. The operation unit 206 is an operation device which is used when the user 170 inputs various operation instructions with respect to the information providing apparatus 150. The communication unit 207 is a communication device through which the information providing apparatus 150 communicates with the management server 110, the Web server 120, or the like.

The audio input/output unit 208 is an input/output device which is used when the user 170 inputs an audio instruction with respect to the information providing apparatus 150, or audio output is performed with respect to the user 170. The GPS functional unit 209 is a device acquiring current position information of the information providing apparatus 150 according to a GPS system.

Outline of Each Processing Executed in Recommend Service Providing System

Next, the outline of each processing executed in the recommend service providing system 100 (collecting processing, profile generating processing, and recommend information providing processing) will be described.

(1) Outline of Collecting Processing

Figure 3:
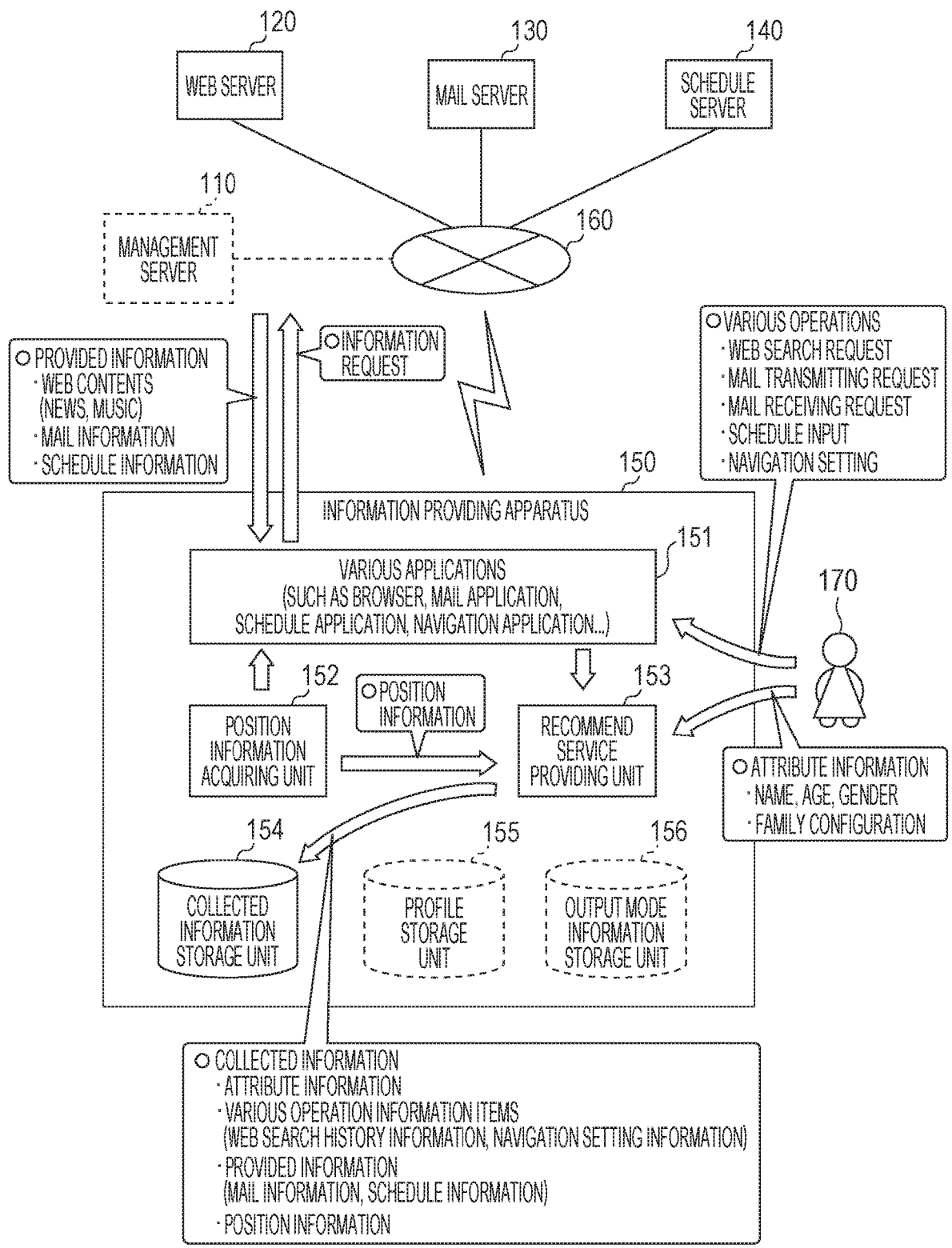
FIG. 3 is a diagram illustrating an outline of collecting processing which is executed in the recommend service providing system.

First, the outline of the collecting processing which is executed in the recommend service providing system 100 will be described. The collecting processing is processing for collecting the collected information. FIG. 3 is a diagram illustrating the outline of the collecting processing which is executed in the recommend service providing system.

The user 170, first, activates the recommend service providing unit 153 of the information providing apparatus 150, and inputs attribute information of the user 170. For example, information such as the name, the age, the gender, and the family configuration of the user 170 is included in the attribute information of the user 170. The recommend service providing unit 153 stores the attribute information which is input by the user 170, in the collected information storage unit 154.

In addition, the user 170, for example, activates the browser of the information providing apparatus 150, and instructs a Web search request. Accordingly, the browser accesses the Web server 120, and performs an information request, and thus, downloads the various Web contents (for example, news contents of a news site, music contents of a music site, and the like). At this time, in the recommend service providing unit 153, a history of the Web search request instructed by the user 170 (Web search history information) is stored in the collected information storage unit 154.

In addition, the user 170, for example, activates the mail application of the information providing apparatus 150, and instructs a mail transmitting request or a mail receiving request. Accordingly, the mail application accesses the mail server 130, and transmits or receives the mail information. At this time, in the recommend service providing unit 153, the transmitted and received mail information is stored in the collected information storage unit 154.

In addition, the user 170, for example, activates the schedule application of the information providing apparatus 150, and inputs a schedule. Accordingly, the schedule application accesses the schedule server 140, and registers the schedule information. At this time, in the recommend service providing unit 153, the registered schedule information is stored in the collected information storage unit 154.

In addition, the user 170, for example, activates the navigation application of the information providing apparatus 150, and instructs setting of navigation. Accordingly, the navigation application executes navigation processing by using the position information which is acquired by the position information acquiring unit 152. At this time, in the recommend service providing unit 153, setting information set in the navigation application or the position information acquired while the navigation application is executed, is stored in the collected information storage unit 154.

Thus, in the recommend service providing system 100, the recommend service providing unit 153 executes the collecting processing, and thus, the collected information described below is stored in the collected information storage unit 154:

Attribute Information (Name, Age, Gender, and Family Configuration)
Various Operation Information Items (Web Search History Information and Navigation Setting Information)
Provided Information (Mail Information and Schedule Information)
Position Information Furthermore, the collected information stored in the collected information storage unit 154 by the recommend service providing unit 153 is user-relevant information including so-called action history of the user 170. Other user-relevant information may also be stored in the collected information storage unit 154 as the collected information.

(2) Outline of Profile Generating Processing

Figure 4:
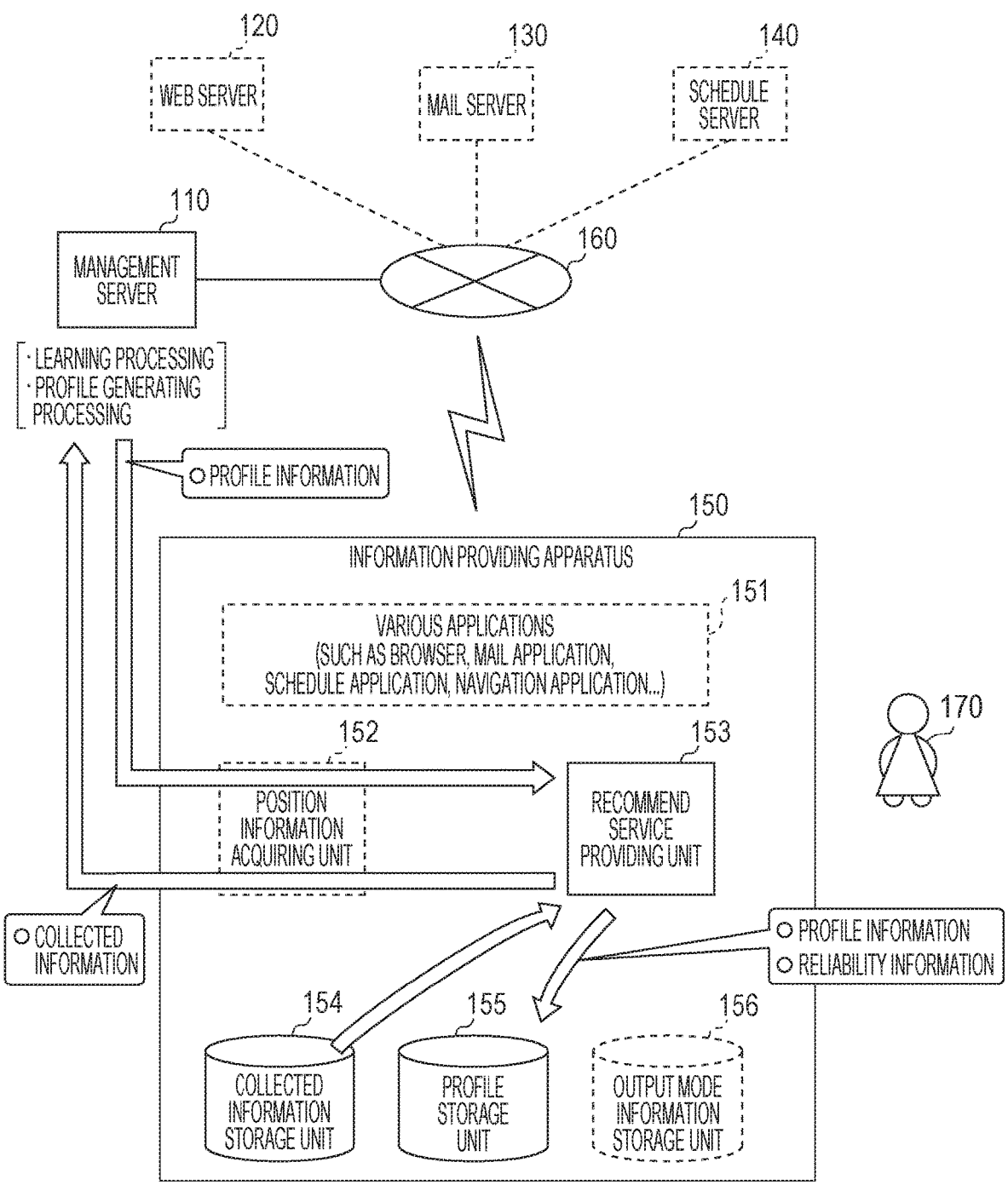
FIG. 4 is a diagram illustrating an outline of profile generating processing which is executed in the recommend service providing system.

Next, the outline of the profile generating processing of the recommend service providing system 100 will be described. The profile generating processing is the process of executing the learning processing on the basis of the collected information, and of generating the profile information. FIG. 4 is a diagram illustrating the outline of the profile generating processing which is executed in the recommend service providing system.

In a case where a predetermined amount of collected information is newly stored in the collected information storage unit 154, the recommend service providing unit 153 transmits the collected information which is stored in the collected information storage unit 154, with respect to the management server 110.

In a case where the collected information is received by the recommend service providing unit 153, the management server 110 performs the learning processing by using the received collected information. In addition, the management server 110 performs the profile generating processing according to the result of the learning processing, and generates the profile information of the user 170. Further, the management server 110 transmits the generated profile information to the recommend service providing unit 153.

The recommend service providing unit 153 stores the profile information, which is received by the management server 110, in the profile storage unit 155. In addition, the recommend service providing unit 153 calculates the reliability of the current profile information, on the basis of the profile information which is accumulated in the profile storage unit 155. The recommend service providing unit 153 stores the reliability of the calculated current profile information in the profile storage unit 155.

(3) Outline of Recommend Information Providing Processing

Figure 5:
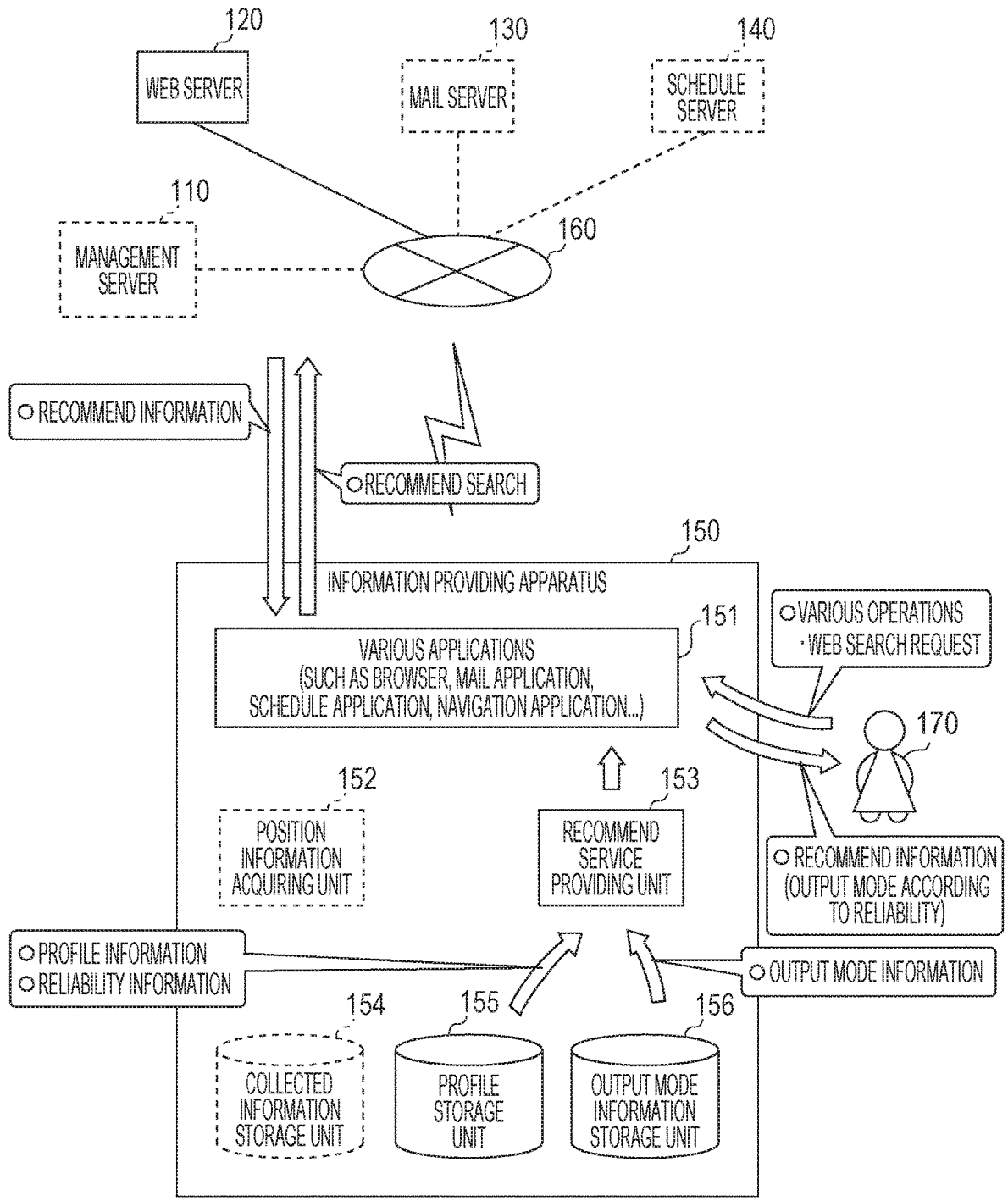
FIG. 5 is a diagram illustrating an outline of recommend information providing processing which is executed in the recommend service providing system.

Next, the outline of the recommend information providing processing of the recommend service providing system 100 will be described. The recommend information providing processing is the process of performing the recommend search according to the profile information, and of performing control such that the acquired recommend information is output in an output mode according to the reliability of the profile information. FIG. 5 is a diagram illustrating the outline of the recommend information providing processing which is executed in the recommend service providing system.

The user 170, for example, activates the browser of the information providing apparatus 150, and instructs the Web search request. In a case where the Web search request is instructed in a state where the profile information of the user 170 is stored in the profile storage unit 155, the recommend service providing unit 153 transmits the recommend search request with respect to the Web server 120 through the browser. The recommend search request is a search request for acquiring the recommend information according to the profile information of the user 170. The recommend search request is transmitted, and thus, the Web server 120 transmits the recommend information as a recommend search result.

In a case where the browser receives the recommend information from the Web server 120, the recommend service providing unit 153 acquires the reliability of the current profile information of the user 170, with reference to the profile storage unit 155. In addition, the recommend service providing unit 153 determines the output mode according to the reliability of the current profile information, with reference to the output mode information storage unit 156. The recommend service providing unit 153 controls the browser such that the recommend information is output in the determined output mode.

Thus, in the recommend service providing system 100, the recommend information providing processing is executed, and thus, the recommend search according to the profile information of the user 170 can be performed. In addition, control can be performed such that the recommend information acquired by the recommend search is output in the output mode according to the reliability of the current profile information of the user 170. As a result thereof, according to this embodiment, when the recommend information is provided, the user is capable of grasping the reliability of the profile information.

Functional Configuration of Recommend Service Providing Unit

Figure 6:
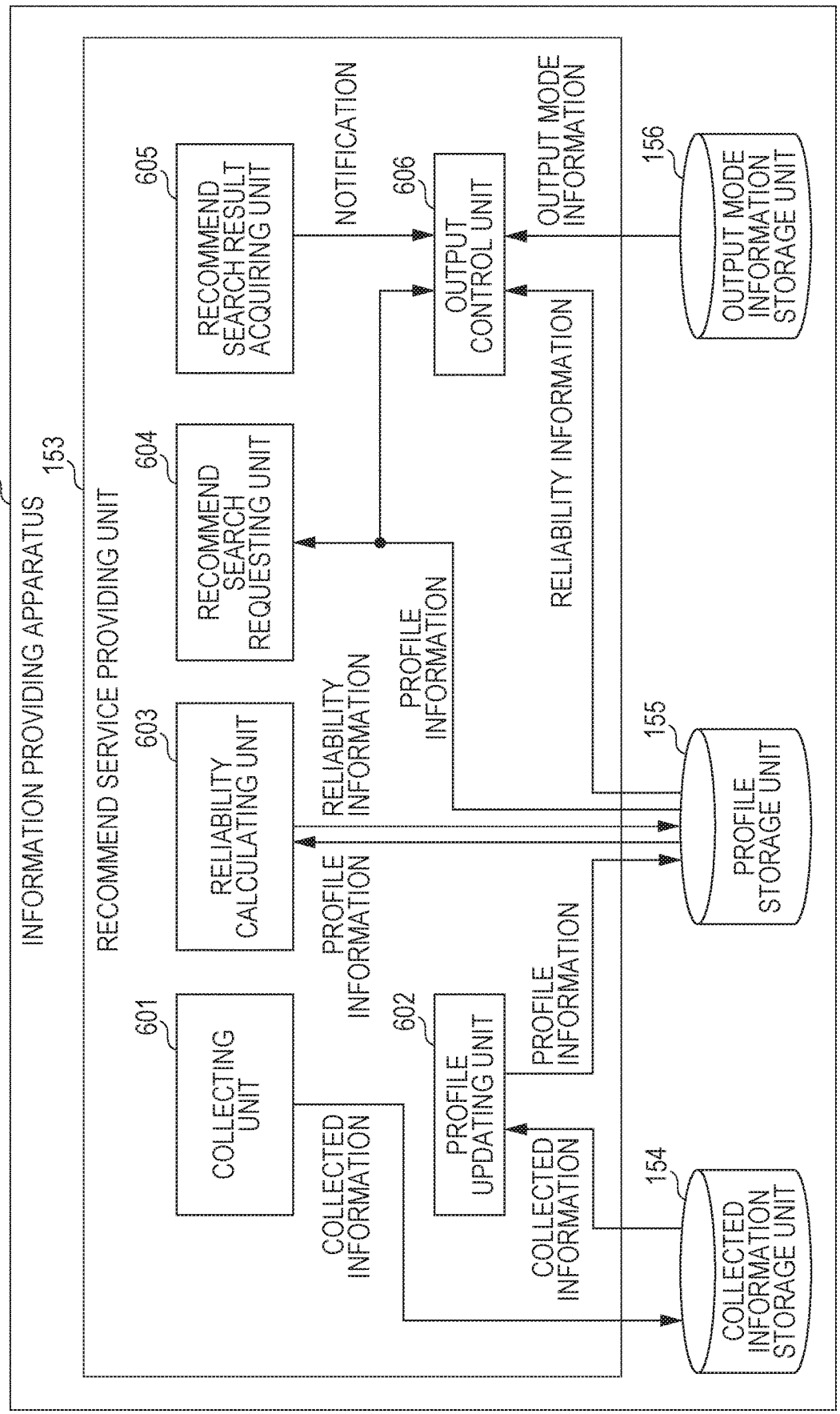
FIG. 6 is a diagram illustrating an example of a functional configuration of a recommend service providing unit.

Next, the details of a functional configuration of the recommend service providing unit 153 of the information providing apparatus 150 will be described. FIG. 6 is a diagram illustrating an example of the functional configuration of the recommend service providing unit. As illustrated in FIG. 6, the recommend service providing unit 153 includes a collecting unit 601, a profile updating unit 602, a reliability calculating unit 603, a recommend search requesting unit 604, a recommend search result acquiring unit 605, and an output control unit 606.

The collecting unit 601 receives the input of the attribute information by the user 170, and stores the attribute information in the collected information storage unit 154. In addition, the collecting unit 601 collects various operation information items (the Web search history information and the navigation setting information), or the provided information (the mail information and the schedule information) while the various applications 151 are activated, and stores the information items in the collected information storage unit 154.

The profile updating unit 602 is an example of an accumulating section. The profile updating unit 602 monitors the collected information storage unit 154, and in a case where a predetermined amount of collected information is newly stored, accesses the management server 110, and transmits the collected information. In addition, in a case where the profile information is received by the management server 110 according to the transmission of the collected information, the profile updating unit 602 sequentially stores the profile information in the profile storage unit 155 and associates the received profile information with the cumulative total of an information amount of the collected information. Accordingly, the profile information is sequentially accumulated in the profile storage unit 155.

The reliability calculating unit 603 is an example of a calculating section, and calculates the reliability of the current profile information on the basis of the profile information which is accumulated in the profile storage unit 155. In addition, the reliability calculating unit 603 stores the calculated reliability in the profile storage unit 155 as reliability information with respect to the current profile information.

In a case where the browser is activated, and the Web search request is instructed in a state where the profile information is stored in the profile storage unit 155, the recommend search requesting unit 604 refers to the profile information which is stored in the profile storage unit 155. Then, the recommend search requesting unit 604 generates the recommend search request according to the profile information of the user 170, and transmits the recommend search request with respect to the Web server 120 through the browser. Furthermore, the recommend search requesting unit 604 notifies the profile information used for generating the recommend search request to the output control unit 606.

The recommend search result acquiring unit 605 is an example of an acquiring section, and receives the recommend information which is transmitted from the Web server 120, according to the transmission of the recommend search request. In addition, the recommend search result acquiring unit 605 notifies that the recommend information is received to the output control unit 606.

The output control unit 606 is an example of a control section, and in a case where the recommend search result acquiring unit 605 notifies that the recommend information is received, the reliability information corresponding to the profile information, which is notified by the recommend search requesting unit 604, is acquired by the profile storage unit 155. In addition, the output control unit 606 determines the output mode according to the acquired reliability information, with reference to the output mode information storage unit 156. Further, the output control unit 606 controls the browser such that the recommend information is output in the determined output mode.

Figure 7:
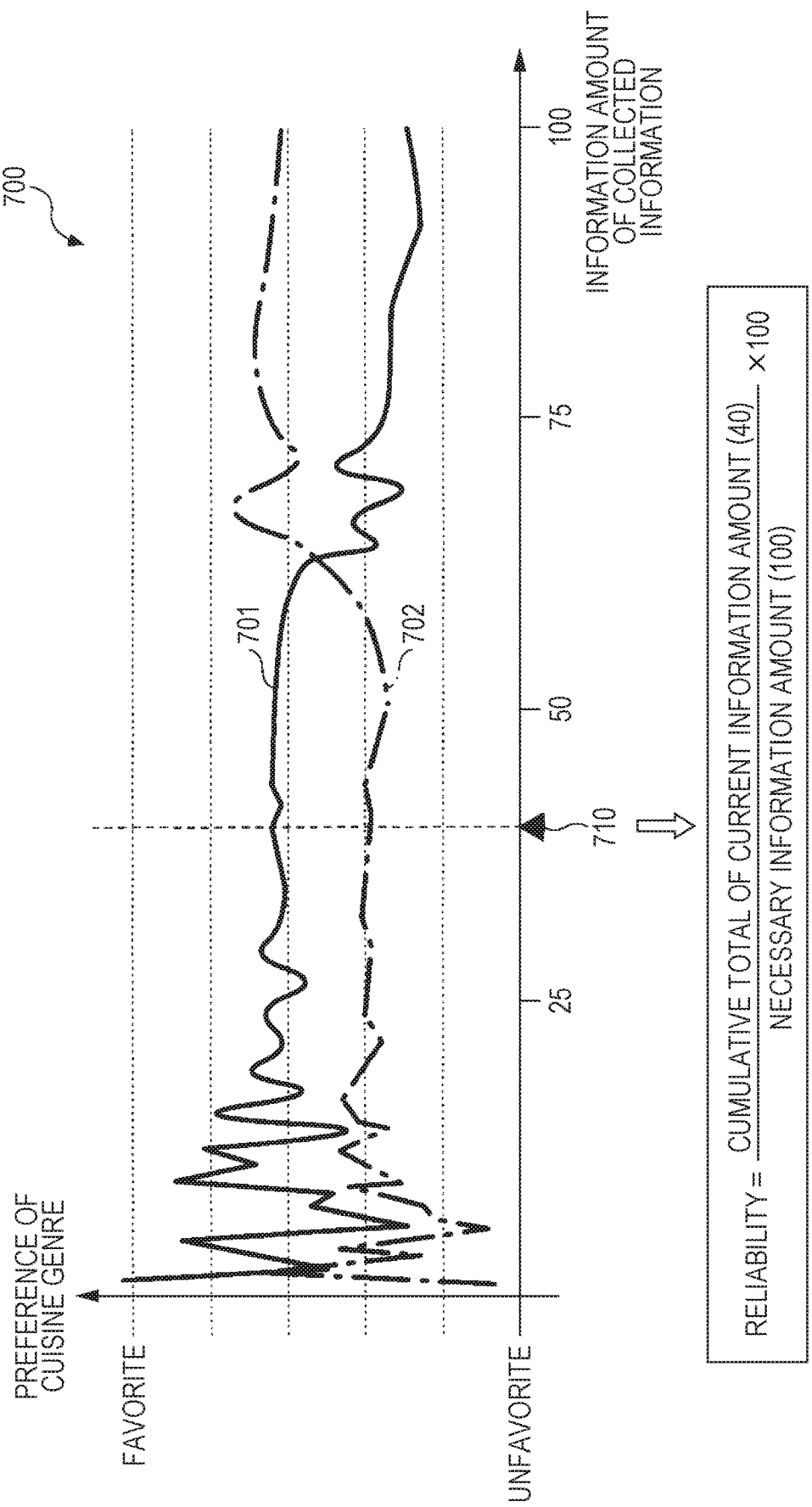
FIG. 7 is a diagram illustrating a specific example of profile information.

Specific Example of Profile Information and Flow of Reliability Calculating Processing of Reliability Calculating Unit (1) Specific Example of Profile Information Next, a specific example of the profile information of the user 170, which is stored in the profile storage unit 155, will be described. FIG. 7 is a diagram illustrating a specific example of the profile information. As illustrated in a graph 700 of FIG. 7, the profile storage unit 155 accumulates the generated profile information in association with the cumulative total of the information amount of the collected information. In the graph 700, a horizontal axis represents the cumulative total of the information amount of the collected information, and a vertical axis represents the profile information with respect to a predetermined index of the user 170.

The profile information is accumulated in association with the cumulative total of the information amount of the collected information for each index, and the graph 700 illustrates an example in which the profile information of Index="Preference of Cuisine Genre" is accumulated in association with the cumulative total of the information amount of the collected information. Furthermore, in the profile information, the information amount of the collected information which is necessary for realizing a sufficient reliability is defined in advance for each of the indices, and in the case of Index="Preference of Cuisine Genre", the necessary information amount of the collected information is set to 100.

In addition, in the case of the profile information of Index="Preference of Cuisine Genre", the vertical axis is divided into five ranks from "Favorite" to "Unfavorite". Accordingly, it is possible to grasp to which rank each cuisine genre (a curved line 701: Italian Cuisine, and a curved line 702: Chinese Cuisine) is assigned at each time point.

Furthermore, the curved line 701 is a curved line generated by sequentially plotting the rank of Cuisine Genre="Italian Cuisine", which is obtained by the learning processing based on the collected information at each of the time points, on the graph 700, and by connecting each plot point. For example, in the Web search request, in a case where the number of times of information search of "Italian Cuisine" increases, the curved line 701 is upwardly changed. Alternatively, in setting of a destination of the navigation setting information, in a case where the number of times of setting of "Italian Restaurant" increases, or in a case where a visiting frequency of "Italian Restaurant" increases as the position information, the curved line 701 is upwardly changed.

Similarly, the curved line 702 is a curved line generated by sequentially plotting the rank of Cuisine Genre="Chinese Cuisine", which is obtained by the learning processing based on the collected information at each time point, on the graph 700, and by connecting each plot point. For example, in the Web search request, in a case where of the number of times of information search of "Chinese Cuisine" increases, the curved line 702 is upwardly changed. Alternatively, in the setting of the destination of the navigation setting information, in a case where the number of times of setting of "Chinese Restaurant" increases, or in a case where a visiting frequency of "Chinese Restaurant" increases as the position information, the curved line 702 is upwardly changed.

In the graph 700 of FIG. 7, a preference is not stable in all of cuisine genres (the curved line 701: Italian Cuisine, and the curved line 702: Chinese Cuisine) at a time point when the cumulative total of the information amount of the collected information is less than or equal to 25% of a necessary information amount. On the other hand, in a case where the cumulative total of the information amount of the collected information is greater than 25% of the necessary information amount, the preference of the cuisine genre is stable. Further, in a case where the cumulative total of the information amount of the collected information is greater than 50% of the necessary information amount, the preference of the cuisine genre of the user 170 is split between "Italian Cuisine" and "Chinese Cuisine", and after that, the preference of the cuisine genre is stable until the cumulative total of the information amount of the collected information reaches 100%.

Here, the reliability calculating unit 603 calculates the reliability information of the current profile information, on the basis of the profile information accumulated in the profile storage unit 155. Specifically, a ratio of the cumulative total of the current information amount with respect to the information amount of the necessary collected information, which is defined in advance for each of the indices, is calculated as the reliability information. For example, in a case where the current time point is a time point represented by a black triangle 710, the cumulative total of the information amount of the current time point is "40". In this case, the reliability calculating unit 603 calculates the reliability information with respect to the current profile information (profile information in which the level of the Italian cuisine is 3.0, and the level of the Chinese cuisine is 2.0, "Preference of Cuisine Genre") as 40%.

(2) Flow of Reliability Calculating Processing of Reliability Calculating Unit

Figure 8:
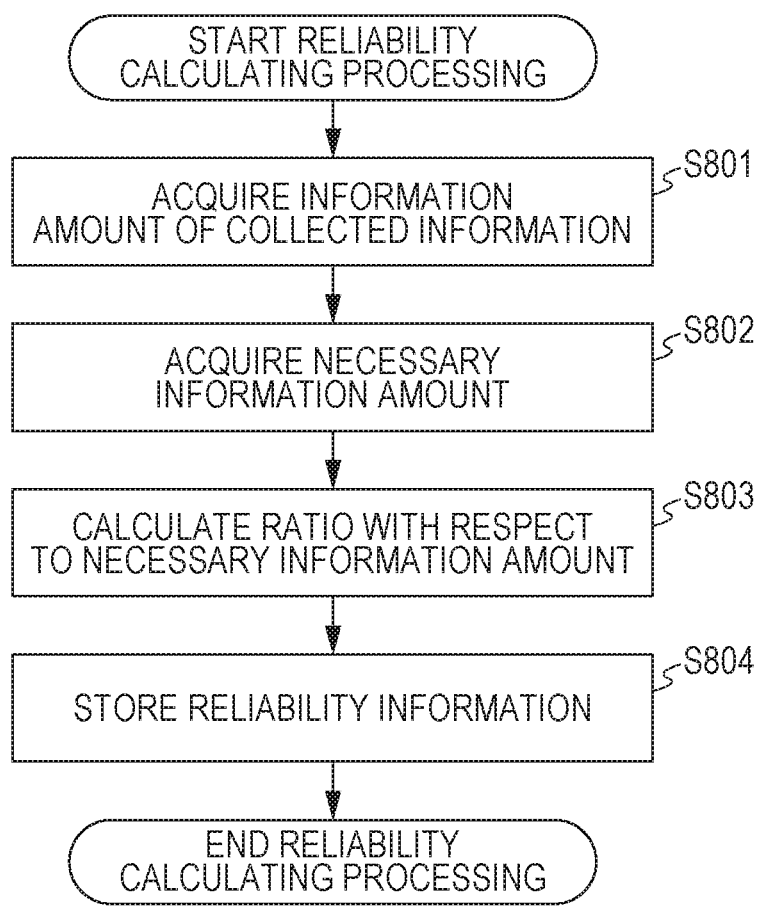
FIG. 8 is a flowchart illustrating a flow of reliability calculating processing.

Next, a flow of the reliability calculating processing of the reliability calculating unit 603 will be described. FIG. 8 is a first flowchart illustrating the flow of the reliability calculating processing. Whenever the profile information is newly stored in the profile storage unit 155, the reliability calculating processing illustrated in FIG. 8 is executed.

In Step S801, the reliability calculating unit 603 reads out the newly stored profile information from the profile storage unit 155, and the cumulative total of the information amount of the collected information, which is used for calculating the read profile information, is acquired by the profile storage unit 155.

In Step S802, the reliability calculating unit 603 acquires the information amount of the collected information necessary for realizing a sufficient reliability, which is defined in advance with respect to the read profile information. In Step S803, the reliability calculating unit 603 calculates a ratio of the cumulative total of the information amount of the collected information acquired in Step S801 with respect to the information amount of the collected information acquired in Step S802, as the reliability information. In Step S804, the reliability calculating unit 603 stores the calculated reliability information in the profile storage unit 155.

Specific Example of Output Mode Information and Flow of Output Control Processing of Output Control Unit (1) Specific Example of Output Mode Information Next, a specific example of the output mode information, which is stored in the output mode information storage unit 156, will be described. FIG. 9 is a diagram illustrating a specific example of the output mode information. As illustrated in FIG. 9, output mode information 900 includes "Reliability", "Contents", and "Audio Tone", as an item of information, and is generated for each of the indices of the profile information (FIG. 9 is the output mode information corresponding to Index="Preference of Cuisine Genre").

The reliability information of the profile information, which is calculated by the reliability calculating unit 603, is stored in "Reliability". In this embodiment, the calculated reliability information is classified into three stages. The audio contents subjected to the audio output on the basis of the recommend information, are stored in "Contents" in association with the reliability information which is classified into each of three stages. The audio tone at the time of performing the audio output with respect to the audio contents stored in the "Contents" is defined in "Audio Tone" in association with the reliability information which is classified into each of three stages.

The output mode information 900 of FIG. 9 is referred by the output control unit 606 when the user 170 instructs the information search request of a recommended restaurant as the Web search request, and thus, the recommend search according to the profile information of Index="Preference of Cuisine Genre" is performed. According to the output mode information 900 illustrated in FIG. 9, in a case where the reliability of the profile information of the user 170 is 0% to 30%, the output control unit 606 controls the browser such that the recommend information is output in the following output mode when the browser outputs the recommend information:

Audio Contents: "I'm not sure whether or not it is appropriate for the preference of Mr. XX, but how about YYY?" (the name of the user 170 is incorporated in XX, and the recommend information is incorporated in YYY)

Audio Tone: Slightly Confident Audio Tone

In addition, in a case where the reliability of the profile information of the user 170 is 30% to 70%, the output control unit 606 controls the browser such that the recommend information is output in the following output mode when the browser outputs the recommend information:

Audio Contents: "I think YYY is appropriate for the preference of Mr. XX" (the name of the user 170 is incorporated in XX, and the recommend information is incorporated in YYY)

Audio Tone: Normal Audio Tone

Further, in a case where the reliability of the profile information of the user 170 is 70% to 100%, the output control unit 606 controls the browser such that the recommend information is output in the following output mode:

Audio Contents: "I recommend YY with confidence for Mr. XX" (the name of the user 170 is incorporated in XX, and the recommend information is incorporated in YYY)

Figure 10:
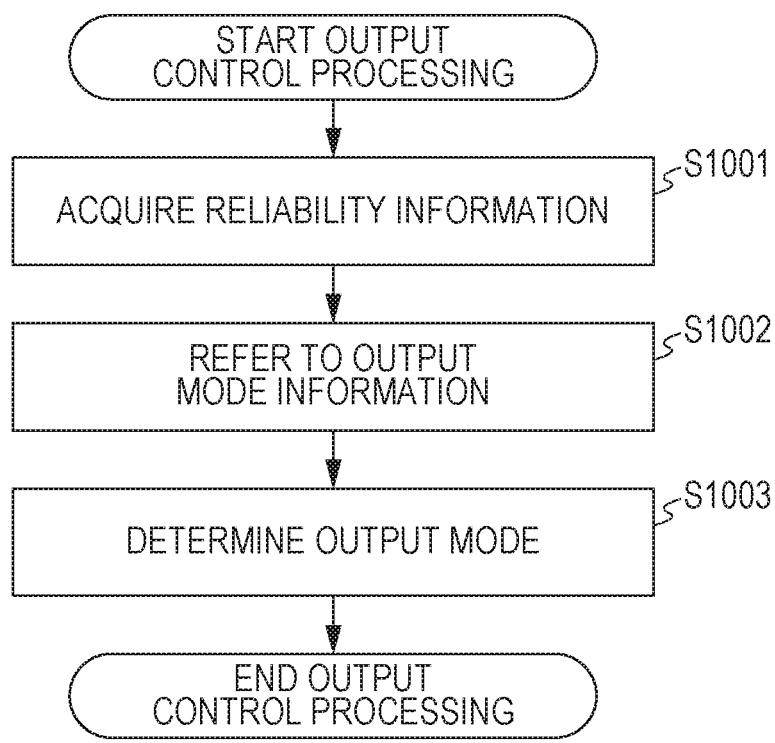
FIG. 10 is a flowchart illustrating a flow of output control processing of an output control unit.

Audio Tone: Confident Audio Tone (2) Flow of Output Control Processing of Output Control Unit Next, a flow of the output control processing of the output control unit 606 will be described. FIG. 10 is a flowchart illustrating the flow of the output control processing of the output control unit. In a case where a notification to the effect of receiving the recommend information from the recommend search result acquiring unit 605, the output control unit 606 executes the output control processing illustrated in FIG. 10.

In Step S1001, the output control unit 606 identifies the profile information which is used when the recommend search requesting unit 604 performs the recommend search, and refers to the profile storage unit 155, and thus, acquires the reliability information corresponding to the identified profile information.

In Step S1002, the output control unit 606 acquires "Contents" and "Audio Tone" corresponding to the acquired reliability information, with reference to the output mode information 900 stored in the output mode information storage unit 156.

In Step S1003, the output control unit 606 notifies acquired "Contents" and "Audio Tone" to the browser outputting the recommend information. Accordingly, in the browser, the name and the recommend information of the user 170 can be incorporated in "Contents" notified by the output control unit 606, and the audio output can be performed in "Audio Tone" notified from the output control unit 606.

Screen Transition in Recommend Information Providing Processing

Figure 11A:
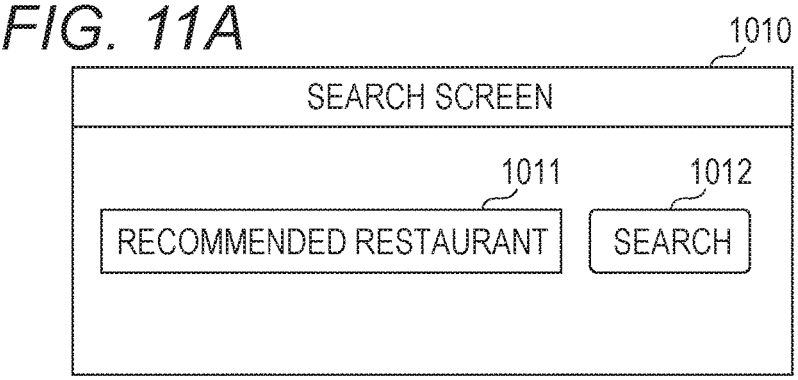
FIGS. 11A to 11C are diagrams illustrating a transition of a display screen when an instruction of a Web search request is input.
Figure 11B:
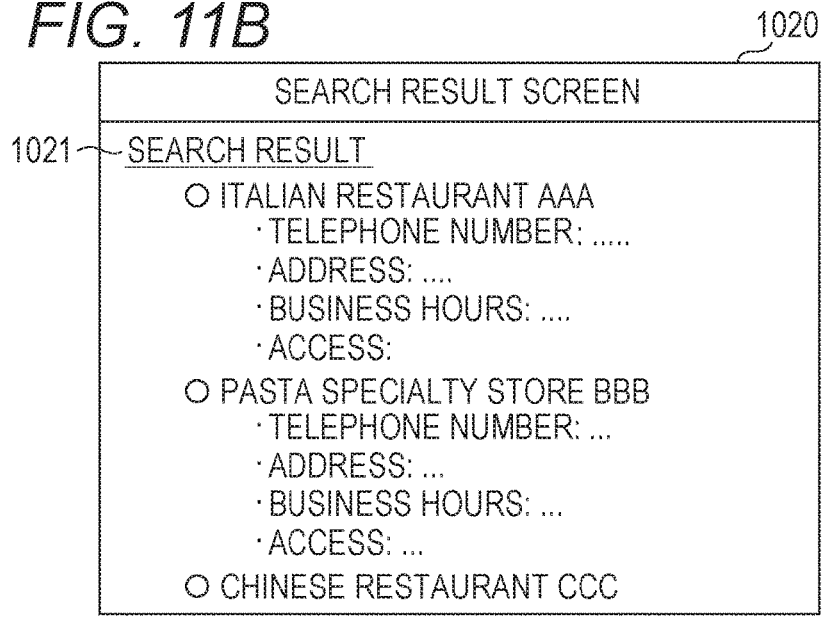
Figure 11C:
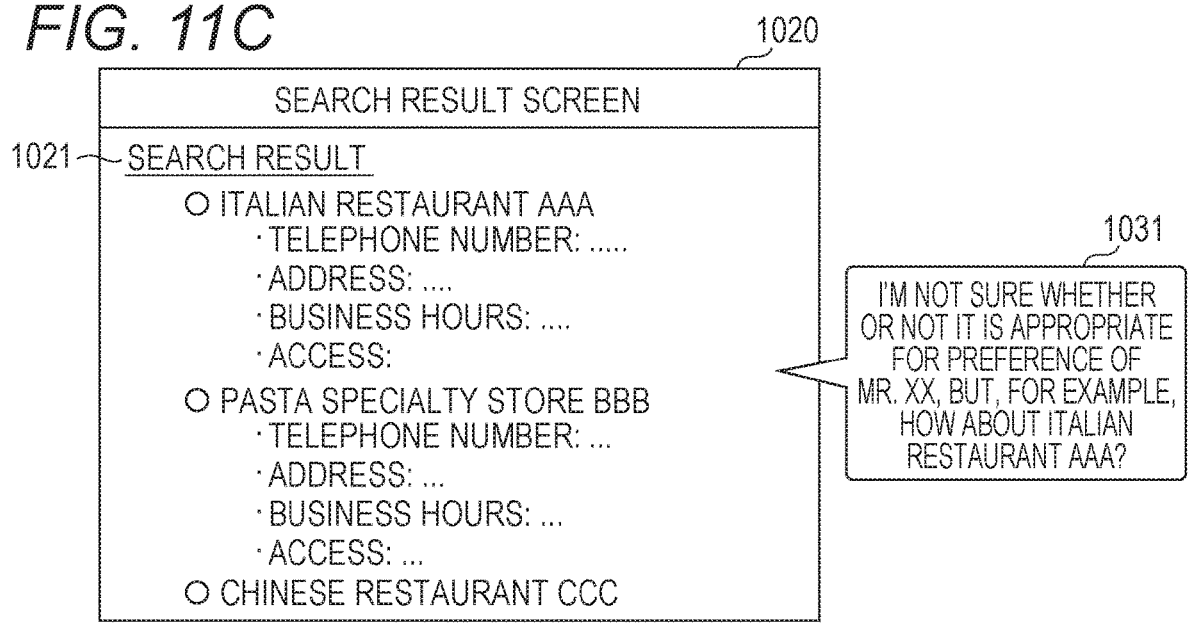

Next, a display screen which is displayed on the display unit 205 of the information providing apparatus 150 by inputting the instruction of the Web search request, and by executing the recommend information providing processing, will be described. FIGS. 11A to 11C are diagrams illustrating a transition of the display screen when the instruction of the Web search request is input. FIG. 11A illustrates an aspect in which the user 170 activates the browser, and a search screen 1010 is displayed on the display unit 205. In the search screen 1010, the user 170 inputs "Recommended Restaurant" into a search keyword input box 1011, and presses a button 1012 for inputting the instruction of the Web search request. Accordingly, the recommend search requesting unit 604 performs the recommend search according to the profile information of the user 170 through the browser, and the recommend search result acquiring unit 605 acquires the recommend information.

FIG. 11B illustrates an aspect in which the browser outputs recommend information 1021 to a search result screen 1020. In the current profile information of the user 170, the level of "Italian Cuisine" with respect to "Preference of Cuisine Genre" is higher than the level of "Chinese Cuisine", and thus, the Italian restaurant is subjected to display output on an upper level, as the recommend information 1021.

Here, the output control unit 606 notifies corresponding "Contents" and "Audio Tone" to the browser from the reliability information corresponding to the profile information which is used when the recommend search requesting unit 604 performs the recommend search, with reference to the output mode information 900. Accordingly, the browser performs the audio output with respect to contents 1031 in the notified audio tone (slightly confident) (refer to FIG. 11C).

As a result thereof, the user 170 is capable of grasping that information on the uppermost level of the displayed recommend information 1021 is a search result of the recommend search using the profile information having a low reliability, from the contents subjected to the audio output and the audio tone at the time of performing the audio output.

Conclusion

As obvious from the above description, the information providing apparatus 150 of this embodiment:
- sequentially accumulates the profile information of the user, which is generated by newly collecting the user-relevant information including the action history of the user, in the profile storage unit;
- performs the recommend search by using the current profile information in the accumulated profile information, and an acquires the recommend information;
- calculates the reliability information of the current profile information, on the basis of the cumulative total of the information amount of the collected information, which is associated with the accumulated profile information; and determines the output mode according to the calculated reliability information, and performs control such that the acquired recommend information is output in the determined output mode.

As such, according to the information providing apparatus 150 of this embodiment, when the recommend information is provided, the user is capable of grasping the reliability of the profile information on the basis of the output mode.

II. Second Embodiment

In the first embodiment, the cumulative total of the information amount of the current collected information is used at the time of calculating the reliability information. Whereas in a second embodiment, the current profile information is compared to the past profile information, and the reliability information is calculated on the basis of a degree of coincidence between the current profile information and the past profile information. In a case where the degree of coincidence between the current profile information and the past profile information is high, the user action from the calculation of the past profile information to the calculation of the current profile information can be an action according to the past profile information. That is, the past profile information and the subsequent action can be coincident with each other. That is, this indicates that the reliability of the past profile information is high (that is, this indicates that the reliability of the current profile information is also high).

FIG. 12 is a first diagram illustrating a specific example of the profile information and a calculating method of the reliability information. In FIG. 12, in a case where the current time point is a time point represented by a black triangle 1220 of graph 700, in the current profile information, the rank of "Italian Cuisine" is 3.2, and the rank of "Chinese Cuisine" is 2.0. In addition, in a case where a time point before a predetermined period is a time point represented by a black triangle 1210 of the graph 700, in the profile information before the predetermined period, the rank of "Italian Cuisine" is 2.0, and the rank of "Chinese Cuisine" is 1.0. In this case, in the reliability calculating unit 603, it is determined that the degree of coincidence between the current profile information and the past profile information is low, and the reliability information of the current profile information is calculated to be low.

On the other hand, in a case where the current time point is a time point represented by a black triangle 1230 of the graph 700, in the current profile information, the rank of "Italian Cuisine" is 3.1, and the rank of "Chinese Cuisine" is 2.0. In addition, the time point before the predetermined period is the time point represented by the black triangle 1220 of the graph 700, in the profile information before the predetermined period, the rank of "Italian Cuisine" is 3.2, and the rank of "Chinese Cuisine" is 2.0. In this case, in the reliability calculating unit 603, it is determined that the degree of coincidence between the current profile information and the past profile information is high, and the reliability information of the current profile information is calculated to be high.

Thus, according to this embodiment, the reliability information can be calculated on the basis of the degree of coincidence between the profile information of the user and the subsequent action of the user.

III. Third Embodiment

In the second embodiment, the current profile information and the profile information before the predetermined period are compared to each other (that is, two profile information items are compared to each other) at the time of calculating the reliability information. Whereas in a third embodiment, a variation in a vibration amplitudes of a plurality of profile information items included in a predetermined time range from the current time to the time point before the predetermined period is used. This is because it is indicated that the profile information is stable as the variation in the vibration amplitudes of the profile information items is small, and the reliability is high.

FIG. 13 is a second diagram illustrating a specific example of the profile information and the calculating method of the reliability information. In FIG. 13, the current time point is a time point represented by a black triangle 1310 of the graph 700. In this case, the reliability calculating unit 603 calculates the variation in the vibration amplitudes of the profile information items in a time range represented by a dotted line 1301, as the past predetermined period. In the case of the example of FIG. 13, the variation in the vibration amplitudes of the profile information items in the time range represented by the dotted line 1301 is large, and thus, the reliability calculating unit 603 calculates the reliability information of the current profile information to be low.

On the other hand, the current time point is a time point represented by a black triangle 1320 of graph 700. In this case, the reliability calculating unit 603 calculates the variation in the vibration amplitudes of the profile information items in the time range represented by a dotted line 1302, as the past predetermined period. In the case of the example of FIG. 13, the variation in the vibration amplitudes of the profile information items in the time range represented by the dotted line 1302, and thus, the reliability calculating unit 603 calculates the reliability information of the current profile information to be high.

Thus, according to this embodiment, the reliability information can be calculated on the basis of the stability of the profile information of the user.

IV. Fourth Embodiment

In the second embodiment, the reliability information is calculated by comparing the current profile information and the past profile information to each other. In a fourth embodiment, the current profile information and the past profile information are compared to each other, and thus, the reliability information is calculated, and "Contents" subjected to the audio output is changed. For example, this is because in a case where there is a variation in the order of levels of the current profile information and the past profile information, the taste of the user can be changed.

FIG. 14 is a diagram illustrating a specific example of the profile information and a change example of the output contents. In FIG. 14, in a case where the current time point is a time point represented by a black triangle 1420 of the graph 700, in the current profile information, the rank of "Chinese Cuisine" is 3.3, and the rank of "Italian Cuisine" is 1.7. In addition, in a case where the time point before the predetermined period is the time point represented by the black triangle 1410 of the graph 700, in the profile information before the predetermined period, the rank of "Italian Cuisine" is 3.0, and the rank of "Chinese Cuisine" is 2.2. In this case, in the reliability calculating unit 603, it is determined that the degree of coincidence between the current profile information and the past profile information is low, the reliability information of the current profile information is calculated to be low.

Further, there is a variation in the order of levels of the current profile information and the past profile information, and thus, in the output control unit 606, the browser is controlled such that the audio output indicating that the taste of the user 170 is changed, is performed. Specifically, the audio contents are changed to "Recently, you also like the Chinese cuisine, I recommend YYY".

Accordingly, the user 170 is capable of grasping that the recommend information 1021 displayed on the search result screen 1020 as the search result is the search result of the recommend search using the profile information having a low reliability. Further, the user 170 is capable of grasping that the cause is due to a change in the taste of the user 170 himself.

V. Other Embodiments

In the first embodiment to the fourth embodiment, the recommend information is subjected to the display output on the search result screen 1020, and the audio output is separately performed in an output mode according to the reliability of the profile information. However, in a case where the instruction of the Web search request is performed by audio input, the recommend information may be subjected to the audio output (but not the display output) in the output mode according to the reliability of the profile information.

In addition, in the first embodiment to the fourth embodiment, the management server 110 executes the learning processing on the basis of the collected information, and the profile information is generated, but the generation of the profile information, for example, may be executed in the information providing apparatus 150.

In addition, in the first embodiment to the fourth embodiment, the information providing apparatus 150 includes the collected information storage unit 154, and whenever a predetermined amount of collected information is newly collected, the collected information is transmitted to the management server 110. However, the collected information storage unit 154 may include the management server 110.

In addition, in the first embodiment to the fourth embodiment, the audio contents and the audio tone according to the reliability information are defined as the output mode information, but output mode information other than the audio contents and the audio tone may be defined according to the reliability information. For example, a sound volume according to the reliability information may be defined as the output mode information other than the audio tone. Alternatively, a sound effect according to the reliability information may be defined as the output mode information other than the audio contents. Furthermore, output other than the audio may be defined as the output mode information.

The present disclosure is not limited to the configurations described in the above embodiments, such as combinations with other elements with respect to the configurations of the embodiments described above. With respect to these combinations, a change can be performed within a range not departing from the gist of the present disclosure, and the combinations can be suitably determined according to application of aspects thereof.

While there has been illustrated and described what is at present contemplated to be preferred embodiments of the present disclosure, it will be understood by those skilled in the art that various changes and modifications may be made, and equivalents may be substituted for elements thereof without departing from the true scope of the disclosure. In addition, many modifications may be made to adapt a particular situation to the teaching of the disclosure without departing from the central scope thereof. Therefore, it is intended that this invention not be limited to the particular embodiments disclosed, but that the invention will include all embodiments falling within the scope of the appended claims.

The invention claimed is:

1. An information providing apparatus comprising:
   an accumulating section for sequentially accumulating profile information of a user over time, which is generated by newly collecting user-relevant information and an action history of the user's interactions with the information providing apparatus;
   an acquiring section for acquiring a search result in a case where information search according to a request of the user is performed by using current profile information in the accumulated profile information, the current profile information including one or more preferences of the user;
   a control section for determining an output mode on the basis of the accumulated profile information to perform control such that the acquired search result is output in the determined output mode; and
   a calculating section for calculating a reliability of the current profile information on the basis of the accumulated profile information;
   wherein the control section determines the output mode according to the reliability.

2. The information providing apparatus according to claim 1,
   wherein the calculating section calculates the reliability on the basis of a cumulative total of an information amount of the user-relevant information, which is associated with the accumulated profile information.

3. The information providing apparatus according to claim 1,
   wherein the calculating section calculates the reliability on the basis of a degree of coincidence between the current profile information and the profile information generated before a predetermined period in the accumulated profile information.

4. The information providing apparatus according to claim 1,
   wherein the calculating section calculates the reliability on the basis of a variation in a plurality of profile information items generated in a past determined period, which includes the current profile information, in the accumulated profile information.

5. The information providing apparatus according to claim 1,
   wherein the control section performs control such that audio contents according to the reliability, in which the search result is incorporated, is output in an audio tone according to the reliability.

6. An information providing method comprising:
   an accumulating step of sequentially accumulating profile information of a user over time, which is generated by newly collecting user-relevant information and an action history of the user's interactions with the information providing apparatus;
   an acquiring step of acquiring a search result in a case where information search according to a request of the user is performed by using current profile information in the accumulated profile information, the current profile information including one ore more preferences of the user;

a control step of determining an output mode on the basis of the accumulated profile information to perform control such that the acquired search result is output in the determined output mode;

a calculating step of calculating a reliability of the current profile information on the basis of the accumulated profile information;

wherein the control section determines the output mode according to the reliability.

* * * * *

UNITED STATES PATENT AND TRADEMARK OFFICE
CERTIFICATE OF CORRECTION

PATENT NO. : 10,698,968 B2  
APPLICATION NO. : 15/955325  
DATED : June 30, 2020  
INVENTOR(S) : Yasuhiro Kawasaki Page 1 of 1

It is certified that error appears in the above-identified patent and that said Letters Patent is hereby corrected as shown below:

In the Claims

Column 16, Claim 4, Line 47, delete "determined" and replace with "predetermined"

Signed and Sealed this  
Eleventh Day of August, 2020

Andrei Iancu  
*Director of the United States Patent and Trademark Office*